United States Patent [19]

Kawai

[11] Patent Number: 5,354,398
[45] Date of Patent: Oct. 11, 1994

[54] METHOD OF MANUFACTURING FIBER-REINFORCED COMPOSITES HAVING A GRADIENT FUNCTION

[75] Inventor: Chihiro Kawai, Hyogo, Japan

[73] Assignee: Sumitomo Electric Industries, Ltd., Osaka, Japan

[21] Appl. No.: 896,205

[22] Filed: Jun. 10, 1992

[30] Foreign Application Priority Data

Aug. 21, 1991 [JP] Japan .................. 3-233873

[51] Int. Cl.$^5$ .................. C03B 29/00; C04B 33/34; F27B 9/14; C23C 16/00
[52] U.S. Cl. .................. 156/89; 156/62.8; 156/245; 264/58; 264/60; 264/113; 264/258; 427/248.1; 427/249
[58] Field of Search .................. 264/258, 58, 60, 113; 156/89, 62.8, 245; 427/248.1, 249

[56] References Cited

U.S. PATENT DOCUMENTS

| | | | |
|---|---|---|---|
| 4,391,873 | 7/1983 | Brassell et al. | 428/297 |
| 4,909,872 | 3/1990 | Jarmon | 156/89 |
| 4,992,318 | 2/1991 | Gadkaree | 428/114 |
| 5,108,678 | 4/1992 | Hirasaka et al. | 264/113 |
| 5,221,645 | 6/1993 | Drouot et al. | 264/58 |

FOREIGN PATENT DOCUMENTS

| | | |
|---|---|---|
| 0355916 | 2/1990 | European Pat. Off. . |
| 8801481 | 5/1988 | Fed. Rep. of Germany . |
| 60-190545 | 9/1985 | Japan . |
| 64-33077 | 2/1989 | Japan . |
| 2239214 | 6/1991 | United Kingdom . |

*Primary Examiner*—James D. Withers
*Attorney, Agent, or Firm*—W. G. Fasse; W. F. Fasse

[57] ABSTRACT

Fiber-reinforced composites having a gradient function and made according to the present method have an excellent mechanical strength characteristic, good oxidation-resistance and good fracture toughness even at high temperatures not lower than 1500° C. The fiber-reinforced composite made according to the present invention includes: a base formed of carbon-fiber reinforced composite sheets having a good mechanical strength characteristic and good fracture toughness and laminated together; and a surface portion laminated to and covering the base and formed of ceramic-fiber reinforced composites having good oxidation-resistance. The carbon content percentage of the base decreases almost successively from a central portion of the base to an interface portion of the base at the surface portion. This results in the fiber-reinforced composite which has good oxidation-resistance, a good mechanical strength characteristic and good fracture toughness even at high temperatures not lower than 1500° C. and in which an abrupt change in respective thermal expansion coefficients of the base and the surface portion at the interface therebetween is reduced by its gradient composition.

14 Claims, No Drawings

METHOD OF MANUFACTURING FIBER-REINFORCED COMPOSITES HAVING A GRADIENT FUNCTION

FIELD OF THE INVENTION

The present invention relates to fiber-reinforced composites and a method of manufacturing such composites and, more particularly, to fiber-reinforced composites having an excellent mechanical strength characteristic, good oxidation-resistance, good erosion-resistance and good fracture toughness at high temperatures, and especially a method of manufacturing such composites.

BACKGROUND INFORMATION

Conventionally, fiber-reinforced composites for use in the field of aeronautics and space comprise carbon or ceramics such as silicon carbide formed as a matrix which is reinforced with carbon fiber or ceramic fiber such as silicon carbide fiber. Of such fiber-reinforced composites, a carbon-fiber reinforced composite exhibits a superior specific mechanical strength (strength per unit weight) and higher fracture toughness even at high temperatures above 1500° C.

Since the carbon-fiber reinforced composite includes carbon fiber, however, the composite has a disadvantage that is has poor oxidation-resistance and poor erosion-resistance at high temperatures.

Thus, in order to eliminate such a disadvantage, a coated layer made of silicon carbide or silicon nitride having excellent oxidation-resistance is formed on a surface. However, since the thermal expansion coefficient of the carbon-fiber reinforced composite is extremely low as compared to that of the coated layer, there is a problem that thermal-cracks are produced in the coated layer during a heat cycle. Consequently, it has been difficult to provide conventional fiber-reinforced composites having good oxidation-resistance and good erosion-resistance.

Further, regarding other reinforcing materials, there are ceramic fiber reinforced composites in which the matrix of silicon carbide or silicon nitride is reinforced with ceramic fiber such as silicon carbide fiber. Since both the reinforcing fiber and the matrix of the ceramic-fiber reinforced composites are formed of substances having good oxidation-resistance and good erosion-resistance, the composites are excellent in oxidation-resistance and good in erosion-resistance at high temperatures and require no oxidation-resistive coated layer. Taking silicon carbide fiber as an example, however, because there is a phenomenon that the mechanical strength of silicon carbide fiber decreases at approximately 1200° C. or more, a composite using these fibers has a poor mechanical strength characteristic at high temperatures.

SUMMARY OF THE INVENTION

One object of the present invention is to obtain fiber-reinforced composites having an excellent mechanical strength characteristic, high oxidation-resistance, high erosion-resistance and good fracture toughness even at high temperatures not lower than 1500° C.

Another object of the present invention is to form fiber-reinforced composites having a gradient function.

A further object of the present invention is to facilitate manufacture of fiber-reinforced composites having a gradient function in a method of manufacturing fiber-reinforced composites.

According to one aspect of the present invention, a fiber-reinforced composite includes: an inner base formed of a carbon-fiber reinforced composite in which a first matrix including heat resisting ceramics is reinforced with carbon fiber; and two surface portions formed on both surfaces of the inner base and formed of a ceramic-fiber reinforced composite in which a second matrix including heat resisting ceramics is reinforced with ceramic fiber; and the carbon fiber content percentage in the inner base decreases almost successively from a central portion of the inner base to an interface portion between the inner base and the surface portions.

Because the ceramic-fiber reinforced composite having good oxidation-resistance and good erosion-resistance is employed for the two surface portions, and the carbon-fiber reinforced composite having a good mechanical strength characteristic and good fracture toughness is employed for the inner base, in operation this fiber-reinforced composite of the present invention has an excellent mechanical strength characteristic under high temperatures and excellent fracture toughness as well as excellent oxidation-resistance and excellent erosion resistance under high temperatures. In addition, because the carbon-fiber content percentage of the inner base decreases almost successively from the central portion of the inner base to the interface between the inner base and the surface portions, the thermal expansion coefficient successively increases from the central portion of the inner base toward the interface between the inner base and the surface portions. Accordingly, the difference between the thermal expansion coefficient of the surface portions and that of the inner base is further decreased at the interface between the surface portions and the inner base as compared to the conventional coated composites described above. This allows preventing the formation or occurrence of thermal-cracks or fracture during a heat cycle.

According to another aspect of the present invention, a fiber-reinforced composite includes: a base formed of a carbon-fiber reinforced composite in which a first matrix including ceramics is reinforced with carbon fiber; and a surface portion formed on one surface of the base and formed of a ceramic-fiber reinforced composite in which a second matrix including ceramics is reinforced with ceramic fiber; and the carbon fiber content percentage in the base decreases almost successively from a central portion of the base to an interface between the base and the surface portion.

Because the ceramic-fiber reinforced composite having good oxidation-resistance and good erosion-resistance is employed for one surface portion of the base that oxidation-resistance, and the carbon-fiber reinforced composite having a good mechanical strength characteristic and good fracture toughness is employed for the base, which makes up the other portions, in operation this fiber-reinforced composite has an excellent mechanical strength characteristic under high temperatures and excellent fracture toughness as well as excellent oxidation-resistance and excellent erosion-resistance under high temperatures. In addition, because the carbon fiber content percentage decreases almost successively from the central portion of the base toward the interface between the base and the surface portion, the thermal expansion coefficient is successively increased from the central portion of the base toward the interface between the base and the surface portion.

Accordingly, the difference between the thermal expansion coefficient of the surface portion and that of the base at the interface between the base and the surface portion is further decreased as compared to the conventional coated composites described above. This results in preventing the formation of thermal-cracks or fracture during a heat cycle.

According to one aspect of the present invention, a method of manufacturing a fiber-reinforced composite includes the steps of: forming a plurality of sheets for a base, wherein the sheets are formed of a carbon-fiber reinforced composite in which a first matrix including ceramics is reinforced with carbon fiber and the sheets have different percentages of carbon fiber content; forming a plurality of sheets for a surface portion, wherein the sheets are formed of a ceramic-fiber reinforced composite in which a second matrix including ceramics is reinforced with ceramic fiber; forming a laminated body by laminating the plurality of base sheets so that the carbon fiber content percentage of the base sheets decreases outwardly from its center to the outside and by laminating the sheets for the surface portion on the base sheets to form two outermost layers; and subjecting the laminated body to heat treatment and then to pressure sintering.

In operation, the plurality of base sheets having different carbon fiber content percentages and the plurality of surface portion sheets made of ceramic-fiber reinforced composites are formed separately. After that, the base sheets are laminated to obtain a predetermined gradient composition, and the surface portion sheets are laminated thereon. The resultant laminated body is then subjected to heat threatment and pressure sintering. Accordingly, a fiber-reinforced composite having a gradient composition can easily be fabricated.

According to another aspect of the present invention, a method of manufacturing a fiber-reinforced composite includes the steps of: forming a plurality of sheets for a base, wherein the sheets are made of a carbon-fiber reinforced composite in which a first matrix including ceramics is reinforced with carbon fiber and the sheets have different carbon fiber content percentages; forming a sheet for a surface portion, wherein the sheet is made of a ceramic-fiber reinforced composite in which a second matrix including ceramics is reinforced with ceramic fiber; forming a laminated body by laminating the plurality of base sheets so that the carbon fiber content percentage of the base sheets decreases outwardly from its center to one outside surface and by laminating the surface portion sheet onto that outside surface of the base sheet formed by an outermost layer base sheet having a decreased carbon fiber content percentage; and subjecting the laminated body to heat treatment and then pressure sintering.

In operation, the plurality of base sheets having different carbon fiber content percentages and the surface portion sheet made of the ceramic-fiber reinforced composite are formed separately. Then, the plurality of base sheets having different carbon fiber content percentages are laminated to obtain a predetermined gradient composition, and the surface portion sheet is laminated onto the base sheet on one outermost layer having a lower carbon fiber content percentage. The resultant laminated body is subjected to heat treatment and then pressure sintering. Accordingly, a fiber-reinforced composite having a gradient composition can easily be fabricated.

DETAILED DESCRIPTION OF PREFERRED EXAMPLE EMBODIMENTS AND OF THE BEST MODE OF THE INVENTION

First, the invention will be described generally, and then several particular examples will be described. In the present invention, one or both surface portions of a laminated composite that require oxidation-resistance and erosion-resistance are formed of ceramic-fiber reinforced composites having excellent oxidation-resistance, while the other portions are formed of carbon (C)-fiber reinforced composites having an excellent mechanical strength characteristic and excellent fracture toughness. Accordingly, the fiber-reinforced composite of the present invention has a good mechanical strength characteristic under high temperatures and good fracture toughness as well as good oxidation-resistance and good erosion-resistance under high temperatures.

Particularly, in order to obtain sufficient oxidation-resistance, it is desirable that the ceramic-fiber reinforced composites constituting the surface portions have a fine texture with no pores. For this purpose, an oxidation-resisting minute coated layer made of silicon carbide (SiC) or silicon nitride ($Si_3N_4$) is preferably provided on one or both of the surfaces made of the ceramic-fiber reinforced composites. Such a coated layer can be formed by employing a conventional thin film forming technique such as a CVD method. In addition, because the fiber-reinforced composite of the present invention has a gradient composition, an abrupt change in thermal expansion coefficient is avoided or decreased at an interface between the carbon-fiber reinforced composite constituting a base and the ceramic-fiber reinforced composites constituting surface portions as compared to the conventional composite. A detailed example structure of the fiber-reinforced composite of the present invention is shown in Tables 1 and 2 below.

TABLE 1

| | | | | | |
|---|---|---|---|---|---|
| SiC/$Si_3N_4$ | $V_f = 55$ | $V_m = 45$ | $V_p = 0$ | $\alpha = 3.0$ | Surface |
| C/$Si_3N_4$ | $V_f = 40$ | $V_m = 55$ | $V_p = 5$ | $\alpha = 2.4$ | Inner base (Gradeint Composition) |
| C/$Si_3N_4$ | $V_f = 50$ | $V_m = 45$ | $V_p = 5$ | $\alpha = 1.6$ | |
| C/$Si_3N_4$ | $V_f = 60$ | $V_m = 35$ | $V_p = 5$ | $\alpha = 1.0$ | |
| C/$Si_3N_4$ | $V_f = 80$ | $V_m = 15$ | $V_p = 5$ | $\alpha = 0.5$ | |
| C/$Si_3N_4$ | $V_f = 60$ | $V_m = 35$ | $V_p = 5$ | $\alpha = 1.0$ | |
| C/$Si_3N_4$ | $V_f = 50$ | $V_m = 45$ | $V_p = 5$ | $\alpha = 1.6$ | |
| C/$Si_3N_4$ | $V_f = 40$ | $V_m = 55$ | $V_p = 5$ | $\alpha = 2.4$ | |
| SiC/$Si_3N_4$ | $V_f = 50$ | $V_m = 45$ | $V_p = 0$ | $\alpha = 3.0$ | Surface |

$V_f$: Percentage of fiber volume content (%)
$V_m$: Percentage of matrix volume content (%)
$V_p$: Porosity
: Thermal expansion coefficient ($\times 10^{-6} K^{-1}$)

TABLE 2

| | | | | | |
|---|---|---|---|---|---|
| SiC/SiC | $V_f = 55$ | $V_m = 45$ | $V_p = 0$ | $\alpha = 3.6$ | Surface |
| C/SiC | $V_f = 40$ | $V_m = 55$ | $V_p = 5$ | $\alpha = 2.6$ | Base (Gradient Composition) |
| C/SiC | $V_f = 50$ | $V_m = 45$ | $V_p = 5$ | $\alpha = 1.9$ | |
| C/SiC | $V_f = 60$ | $V_m = 35$ | $V_p = 5$ | $\alpha = 1.3$ | |
| C/SiC | $V_f = 80$ | $V_m = 15$ | $V_p = 5$ | $\alpha = 0.6$ | |

$V_f$: Percentage of fiber volume content (%)
$V_m$: Percentage of matrix volume content (%)
$V_p$: Porosity
: Thermal expansion coefficient ($\times 10^{-6} K^{-1}$)

With reference to Tables 1 and 2 above, the carbon fiber volume content percentage of an inner base shown in Table 1 and a base shown in Table 2, made of carbon-fiber reinforced composites (C/Si$_3$N$_4$ or C/SiC) is almost successively decreased toward surfaces shown in Tables 1 and 2, formed of SiC fiber composites (SiC/Si$_3$N$_4$ or SiC/SiC). At the same time, the matrix volume content percentage is almost successively increased. Accordingly, because the thermal expansion coefficient of the overall structure including the surfaces varies almost successively, an abrupt change in thermal expansion coefficient between the base and the surface or surfaces is reduced, thereby decreasing thermal stresses. This enables an effective reduction in the formation or occurrence of thermal-cracks, separation, fracture and the like in the surfaces.

It should be noted that materials other than those shown in Tables 1 and 2 above can be used to make the composites according to the invention. The matrix materials are to include heat resisting ceramics, but can also include other materials, such as carbon, which have been used in conventional composites.

The fiber-reinforced composite having the above general example composition was fabricated in practice in the following Examples 1–3.

EXAMPLE 1

SiC powder of 2 μm average grain size was employed as a matrix. This SiC powder was mixed with a slight amount of Al$_2$O$_3$ powder and then kneaded with acrylamide resin. The mixture was then applied onto a fabric cloth of SiC fiber. As a result, a SiC/SiC composite sheet made of SiC fiber and SiC powder was obtained. A mass ratio of the fiber/applied matter of the SiC/SiC composite sheet was set to 0.95.

Then, SiC powder of 2 μm average grain size was employed as a matrix, and this SiC powder was mixed with a slight amount of Al$_2$O$_3$ powder and then kneaded with acrylamide resin. The mixture was applied in different amounts onto a fabric of carbon fiber. As a result, C/SiC composite sheets a to c formed of carbon fiber and SiC powder were obtained. Mass ratios of the fiber/applied matter of these C/SiC composite sheets were as follows: composite sheet a, 0.88; composite sheet b, 0.91; and composite sheet c, 0.95.

Combining the composite sheets a to c resulted in the following laminated body. That is, 21 composite sheets in total were laminated in the following order: SiC/SiC composite sheets (3 sheets), C/SiC composite sheets a (3 sheets), C/SiC composite sheets b (3 sheets), C/SiC composite sheets c (3 sheets), C/SiC composite sheets b (3 sheets), C/SiC composite sheets a (3 sheets), and SiC/SiC composite sheets (3 sheets). After that, this laminated body was heated at 500° C. for three hours and volatile matter was removed. The resultant body was then subjected to pressure sintering at 2000° C. under a pressure of 200 Kg/cm$^2$ for two hours. Accordingly, a composite (hereinafter referred to as C-SiC/SiC) 50 mm in length by 50 mm in width by 4 mm in thickness was manufactured.

This composite has a gradient function and is formed of silicon carbide (SiC) reinforced with carbon (C) fiber and silicon carbide (SiC) fiber. For the C-SiC/SiC sample thus fabricated, its bending strength at room temperature and at 1500° C. and a fracture toughness value K$_{IC}$ by an SEPB method was measured. Moreover, a laminated surface of the sample was covered with a mask and held in the atmosphere at 1700° C. for one hour. From changes in the mass of the sample before and after it was held in the atmosphere, a mass loss of the sample after oxidation was obtained.

As reference examples, four examples were manufactured: a SiC/SiC composite of a uniform composition in which a SiC matrix is reinforced only with SiC fiber (a mass ratio of SiC fiber/SiC matrix: 0.95), and C/SiC composites A to C of a uniform composition in which a SiC matrix is reinforced only with carbon (C) fiber (mass ratios of C fiber/SiC matrix: A, 0.88; B, 0.91; and C, 0.95). The same tests described above were also carried out with respect to those four reference examples.

The result of the tests with respect to Example 1 and the above four reference examples is shown in Table 3 below.

TABLE 3

| Composites | Thermal Expansion Coefficients ($\times 10^{-6}$) | Bending Strength (MPa) | | K$_{IC}$ (MPam$^{\frac{1}{2}}$) | | Mass Loss (/mg · cm$^{-2}$) |
| --- | --- | --- | --- | --- | --- | --- |
| | | Room Temp. | 1500° C. | Room Temp. | 1500° C. | |
| C—SiC/SiC | — | 320 | 330 | 30 | 30 | 2.1 |
| SiC/SiC* | 3.5 | 220 | 85 | 15 | 15 | 2.2 |
| C/SiC A* | 2.4 | 140 | 135 | 16 | 16 | 23.2 |
| C/SiC B* | 1.5 | 210 | 220 | 22 | 22 | 46.8 |
| C/SiC C* | 0.7 | 350 | 360 | 35 | 34 | 80.2 |

Note: Marks * denote reference examples.

Referring to Table 3 above, it is noted that with respect to C-SiC/SiC in Example 1, the mass loss due to oxidation is considerably smaller than those of reference examples A to C. It is also noted that the bending strength of C-Sic/SiC in Example 1 is considerably larger than that of SiC/SiC in the reference example. It is further noted that the fracture toughness value K$_{IC}$ of C-SiC/SiC in Example 1 is larger than those of the reference examples (SiC/SiC, C/SiC (A) and C/SiC (B)).

As mentioned above, it is understood that the C-SiC/SiC composite of Example 1 has an excellent mechanical strength characteristic, excellent oxidation-resistance and high fracture toughness even at high temperatures not lower than 1500° C.

EXAMPLE 2

Si$_3$N$_4$ powder of 2 μm average grain size was employed as a matrix. This Si$_3$N$_4$ powder was mixed with a slight amount of Al$_2$O$_3$ powder and then kneaded with acrylamide resin. This mixture was applied onto a fabric of SiC fiber. As a result, a SiC/Si$_3$N$_4$ composite sheet made of SiC fiber and Si$_3$N$_4$ powder was obtained. A mass ratio of the fiber/applied matter of the SiC/Si$_3$N$_4$ composite sheet was set to 0.94.

Then, Si$_3$N$_4$ powder of 2 μm average grain size was employed as a matrix. This Si$_3$N$_4$ powder was mixed with a slight amount of Al$_2$O$_3$ powder and then kneaded with acrylamide resin. This mixture was applied in different amounts to a fabric of carbon fiber. As a result, $C/Si_3N_4$ composite sheets d to f made of carbon fiber and $Si_3N_4$ powder were obtained. Mass ratios of the fiber/applied matter of those $C/Si_3N_4$ composite sheets were: composite sheet d, 0.87; e, 0.91; and f, 0.94.

Combining those composite sheets resulted in the following laminated body. That is, 20 composite sheets in total were laminated in the following order: SiC/-$Si_3N_4$ composite sheets (5 sheets), $C/Si_3N_4$, composite sheets d (5 sheets), $C/Si_3N_4$ composite sheets e (5 sheets), and $C/Si_3N_4$ composite sheets f (5 sheets). After that, the laminated body was heated at 500° C. for three hours and its volatile matter was removed. The resultant laminated body was then pressure-sintered at 2000° C. under a pressure of 200 Kg/cm². This resulted in the manufacture of a composite (hereinafter referred to as $C$-$SiC/Si_3N_4$) 50 mm in length by 50 mm in width by 4.2 mm in thickness, having a gradient function and formed of silicon nitride ($Si_3N_4$) reinforced with carbon (C) fiber and silicon carbide (SiC) fiber.

For the $C$-$SiC/Si_3N_4$ sample thus manufactured, its bending strength at room temperature and 1500° C. (bending strength in a direction in which tensile load was applied to the $C/Si_3N_4$ composite), and its fracture toughness value $K_{IC}$ by the SEPB method were measured. Also, a laminated surface and a $C/Si_3N_4$ composite surface of the corresponding sample were covered with a mask and then held in the atmosphere at 1500° C. for an hour. From changes in the mass of the sample before and after it was held in the atmosphere, a mass loss of the sample after oxidation was obtained.

As reference examples, four examples were manufactured: a $SiC/Si_3N_4$ composite of a uniform composition in which a $Si_3N_4$ matrix is reinforced only with SiC fiber (a mass ratio of SiC fiber/$Si_3N_4$ matrix is 0.94), and $C/Si_3N_4$ composites D to F of a uniform composition in which an $Si_3N_4$ matrix is reinforced only with carbon (C) fiber (mass ratios of carbon (C) fiber/$Si_3N_4$ matrix are: composite D, 0.87; E, 0.91; and F, 0.94). The same tests as described above were also carried out with respect to those four reference examples.

With respect to the composite of Example 2 and the four reference examples thus manufactured, the result of the tests is shown in Table 4 below.

mechanical strength characteristic and good fracture toughness at high temperatures not lower than 1500° C.

EXAMPLE 3

SiC powder of 2 μm average grain size was employed as a matrix. This SiC powder was mixed with a slight amount of $Al_2O_3$ powder and then kneaded with acrylamide resin. This mixture was then applied onto a cloth of Si-C-N fiber, so that a Si-C-N/SiC composite sheet formed of Si-C-N fiber and SiC powder was obtained. A mass ratio of the fiber/applied matter of the Si-C-N/SiC composite sheet was 0.94.

Then, $B_4C$ powder of 2 μm average grain size was employed as a matrix. This $B_4C$ powder was mixed with a slight amount of $Al_2O_3$ powder and then kneaded with acrylamide resin. This mixture was then applied in different amounts onto a cloth of carbon fiber, so that $C/B_4C$ composite sheets g to i formed of carbon fiber and $B_4C$ powder were obtained. Mass ratios of the fiber/applied matter of those $C/B_4C$ composite sheets were as follows: composite sheet g, 0.87; h, 0.91; and i, 0.94.

Combining those composite sheets resulted in the following laminated body. That is, 20 composite sheets in total were laminated in the following order: Si-C-N/SiC composite sheets (5 sheets), $C/B_4C$ composite sheets g (5 sheets), $C/B_4C$ composite sheets h (5 sheets), and $C/B_4C$ composite sheets i (5 sheets). After that, the laminated body was heated at 500° C. for three hours and its volatile matter was removed. The resultant laminated body was then pressure-sintered at 1800° C. under a pressure of 200 Kg/cm² for two hours. Accordingly, a composite (hereinafter referred to as C-, Si-C-N/$B_4C$-SiC) 50 mm in length by 50 mm in width by 3.9 mm in thickness was manufactured. This composite has a gradient function including $B_4C$ and SiC reinforced with carbon (C) fiber and Si-C-N fiber.

With respect to the C-,Si-C-N/$B_4C$-SiC sample thus manufactured, its bending strength at room temperature and at 1500° C. (bending strength in a direction in which tensile load is applied to the $C/B_4C$ composite) and a fracture toughness value $K_{IC}$ by the SEPB method were measured. Also, a laminated surface and a $B_4C$

TABLE 4

| Composites | Thermal Expansion Coefficients ($\times 10^{-6}$) | Bending Strength (MPa) | | $K_{IC}$ (MPam$^{\frac{1}{2}}$) | | Mass Loss (/mg · cm$^{-2}$) |
| --- | --- | --- | --- | --- | --- | --- |
| | | Room Temp. | 1500° C. | Room Temp. | 1500° C. | |
| C—SiC/$Si_3N_4$ | — | 440 | 330 | 36 | 36 | 2.4 |
| SiC/$Si_3N_4$* | 3.0 | 320 | 103 | 13 | 13 | 3.5 |
| C/$Si_3N_4$ D* | 2.2 | 190 | 185 | 16 | 17 | 23.2 |
| C/$Si_3N_4$ E* | 1.2 | 278 | 284 | 21 | 22 | 49.9 |
| C/$Si_3N_4$ F* | 0.5 | 475 | 465 | 38 | 38 | 74.3 |

Note: Marks * denote reference examples.

Referring to Table 4 above, it is noted that the mass loss of C-SiC/$Si_3N_4$ of Example 2 is considerably smaller than those of C/$Si_3N_4$ composites D to F of the reference examples. This demonstrates that C-SiC/-$Si_3N_4$ of this example has good oxidation-resistance. It is also noted that the bending strength of C-SiC/$Si_3N_4$ of Example 2 is superior particularly at high temperatures to that of SiC/$Si_3N_4$ of the reference example. It is further noted that the fracture toughness value $K_{IC}$ of C-SiC/$Si_3N_4$ of Example 2 is higher than those of SiC/-$Si_3N_4$ and C/$Si_3N_4$ D and E of the reference examples.

As described above, it is understood that the composite of Example 2 has good oxidation-resistance, good composite surface of the corresponding sample were covered with a mask and then held in the atmosphere at 1700° C. for an hour. From changes in the mass of the sample before and after it was held in the atmosphere, a mass loss of the sample after oxidation was obtained.

In addition, using the above-described C-,Si-C-N/$B_4C$-SiC sample as a base material, an SiC coated layer was formed to a thickness of approximately 100 μm on the surface of the Si-C-N/SiC composite surface under conditions of 1500° C. and 100 Torr by a CVD method using $SiCl_4$, $CH_4$ and $H_2$ as a material gas. For this SiC coated sample, like the foregoing sample, its bending strength at room temperature and at 1500° C.

and its fracture toughness value by the SEPB method were measured. Also, from changes in the mass of the sample before and after it was held in the atmosphere at 1700° C. for an hour, a mass loss of the sample after oxidation was obtained.

Four reference examples were manufactured: a Si-C-N/SiC composite of a uniform composition in which a SiC matrix is reinforced only with Si-C-N fiber (a mass ratio of Si-C-N fiber/SiC matrix is 0.94), and C/B$_4$C composites G to I of a uniform composition in which a B$_4$C matrix is reinforced only with carbon (C) fiber (mass ratios of C fiber/B$_4$C matrix are: G, 0.86; H, 0.91; and I, 0.93). The same tests described above were carried out also for those four reference examples.

The result of the tests for the composite of Example 3 and of the four reference examples thus manufactured is shown in Table 5 below.

TABLE 5

| Composites | Thermal Expansion Coefficients ($\times 10^{-6}$) | Bending Strength (MPa) | | $K_{IC}$(MPam$^{\frac{1}{2}}$) | | Mass Loss (/mg · cm$^{-2}$) |
| --- | --- | --- | --- | --- | --- | --- |
| | | Room Temp. | 1500° C. | Room Temp. | 1500° C. | |
| C—, Si—C—N/B$_4$C—SiC | — | 315 | 305 | 33 | 32 | 0.2 |
| SiC coat sample | — | 315 | 306 | 33 | 32 | 0.0 |
| Si—C—N/SiC* | 3.0 | 215 | 100 | 13 | 13 | 0.2 |
| C/B$_4$C G* | 2.3 | 155 | 145 | 15 | 16 | 30.2 |
| C/B$_4$C H* | 1.4 | 215 | 222 | 21 | 22 | 85.2 |
| C/B$_4$C I* | 0.4 | 330 | 298 | 34 | 34 | 125.3 |

Note: Marks * denote reference examples.

Referring to the above Table 5, it is noted that the mass loss of C-,Si-C-N/B$_4$C-SiC of Example 3 is considerably lower than those of C/B$_4$C (G to I) of the reference examples. This indicates that C-,Si-C-N/B$_4$C-SiC of Example 3 has good oxidation-resistance. It is also noted that the bending strength of C-,Si-C-N/B$_4$C-SiC of Example 3 is superior particularly at a high temperature of 1500° C. to that of Si-C-N/SiC of the reference example. It is further noted that the fracture toughness value K$_{IC}$ of C-,Si-C-N/B$_4$C-SiC of Example 3 is higher than those of SiC-N/SiC, and C/B$_4$C (G and H) of the reference examples. As shown above, C-,Si-C-N/B$_4$C-SiC of Example 3 has excellent oxidation-resistance, an excellent mechanical strength characteristic and excellent fracture toughness at high temperatures not lower than 1500° C. It is further noted that the C-,Si-C-N/B$_4$C-SiC composite of Example 3 additionally having its Si-C-N/SiC composite surface covered with a SiC coated layer is superior in oxidation-resistance as compared to Example 3.

As described above, in one fiber-reinforced composite of the present invention, an inner base is formed of carbon-fiber reinforced composites having an excellent mechanical strength characteristic and excellent fracture toughness, two surface portions formed on both surfaces of the inner base are formed of ceramic-fiber reinforced composites having excellent oxidation-resistance, and the carbon fiber content percentage of the inner base decreases almost successively from the central portion of the inner base toward the interface between the inner base and the surface portions. Because of this structure, it is possible to provide the fiber-reinforced composite exhibiting a good mechanical strength characteristic, good oxidation-resistance and good fracture toughness even at high temperatures not lower than 1500° C. Further, forming the inner base having a gradient composition makes it possible to successively change the thermal expansion coefficient α between the base and the surface portions to become more nearly equal at the interface therebetween. This makes it possible to prevent a fracture of the composite and occurrence of thermal-cracks in the coated layer during a heat cycle and also prevent a deterioration in oxidation-resistance.

In another fiber-reinforced composite of the present invention, a base is formed of carbon-fiber reinforced composites having a good mechanical strength characteristic and good fracture toughness, a surface portion covering one surface of the base is formed of ceramic-fiber reinforced composites having good oxidation-resistance, and the carbon-fiber content percentage of the base decreases almost successively from the central portion of the base toward the interface between the base and the surface portion. Because of this structure, the surface portion, even exposed to high temperatures, can obtain excellent oxidation-resistance and the composite achieves an excellent mechanical strength characteristic and excellent fracture toughness even at high temperatures not lower than 1500° C. Further, forming the base having a gradient composition makes it possible to successively change the thermal expansion coefficient α between the base and the surface portion to become more nearly equal at the interface therebetween. This results in effective prevention of a fracture of the composite and thermal-cracks in the surface portion during a heat cycle and of a deterioration in oxidation-resistance.

In one method of manufacturing a fiber-reinforced composite according to the present invention, a plurality of base sheets formed of carbon-fiber reinforced composites and having different percentage of carbon-fiber content and sheets for surface portions formed of ceramic-fiber reinforced composites are formed separately. The base sheets are laminated so that their carbon fiber content percentages decrease from the center to the outside, and also the surface portion sheets are laminated on outermost layers of both sides of the base. A resultant laminated body is then subjected to heat treatment and then pressure-sintering, whereby a fiber-reinforced composite having excellent oxidation-resistance, a good mechanical strength characteristic and excellent fracture toughness even at high temperatures not lower than 1500° C. can easily be manufactured.

In another method of manufacturing a fiber-reinforced composite according to the present invention, a plurality of sheets for a base, formed of carbon-fiber reinforced composites and having different percentages of carbon fiber content and a sheet for a surface portion, made of ceramic-fiber reinforced composites, are separately formed. The base sheets are laminated so that their carbon fiber content percentages decrease from the center toward one outside layer, and the surface portion sheet is laminated on the base sheet onto that outermost layer, the carbon-fiber content percentage of which is decreased. A resultant laminated body is then subjected to heat treatment and then pressure-sintering, whereby a fiber-reinforced composite which has excellent oxidation-resistance, a good mechanical strength characteristic and excellent fracture toughness even if its surface portion sheet is exposed to high temperatures not lower than 1500° C. can be manufactured.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of manufacturing a fiber-reinforced composite comprising the steps of:
   forming a plurality of base sheets comprising a first matrix comprising ceramics reinforced with carbon fibers, wherein at least two base sheets have a different volume percentage of said carbon fibers;
   forming a surface portion sheet comprising a second matrix comprising ceramics reinforced with ceramic fibers;
   forming a laminated body by laminating said plurality of base sheets so that the carbon fiber volume percentage of said base sheets decreases from a center base sheet to one outside base sheet and also laminating said surface portion sheet on said outside base sheet; and
   subjecting said laminated body to heat treatment and then pressure sintering.

2. The method according to claim 1, wherein said first matrix comprises at least one matrix material selected from the group consisting of silicon carbide and silicon nitride, and said second matrix comprises at least one matrix material selected from the group consisting of silicon carbide, silicon nitride, boron carbide and alumina.

3. The method of claim 1, wherein said second matrix further comprises carbon.

4. The method of claim 1, further comprising the step of forming an oxidation resistant coating layer on an outer surface of said surface portion sheet.

5. The method of claim 4, wherein said step of forming an oxidation resistant coating layer comprises depositing a layer of a ceramic material selected from the group consisting of silicon carbide, silicon nitride and combinations thereof by chemical vapor deposition.

6. The method of claim 1, wherein said pressure sintering is carried out at a temperature in the range from about 1800° C. to about 2000° C. and at a pressure of about 200 Kg/cm².

7. The method of claim 1, wherein said step of forming a surface portion sheet comprises preparing a matrix composition comprising a ceramic powder and applying said matrix composition to a cloth comprising fibers selected from the group consisting of SiC, Si-C-N, and combinations thereof.

8. A method of manufacturing a fiber-reinforced composite comprising the steps of:
   forming a plurality of sheets for a base, said base sheets comprising a first matrix comprising ceramics reinforced with carbon fibers, wherein at least two base sheets have a different volume percentage of said carbon fibers;
   forming a plurality of sheets for surface portions, said surface portion sheets comprising a second matrix comprising ceramics reinforced with ceramic fibers;
   laminating said plurality of base sheets so that the carbon fiber volume percentage of said base sheets decreases from a center base sheet to two outside base sheets, and laminating said surface portion sheets on said two outside base sheets, so as to form a laminated body; and
   subjecting said laminated body to heat treatment and then pressure sintering.

9. The method according to claim 8, wherein said first matrix comprises at least one matrix material selected from the group consisting of silicon carbide and silicon nitride, and said second matrix comprises at least one matrix material selected from the group consisting of silicon carbide, silicon nitride, boron carbide and alumina.

10. The method of claim 8, wherein said second matrix further comprises carbon.

11. The method of claim 8, further comprising the step of forming an oxidation resistant coating layer on an outer surface of at least one of said surface portion sheets.

12. The method of claim 11, wherein said step of forming an oxidation resistant coating layer comprises depositing a layer of a ceramic material selected from the group consisting of silicon carbide, silicon nitride and combinations thereof by chemical vapor deposition.

13. The method of claim 8, wherein said pressure sintering is carried out at a temperature in the range from about 1800° C. to about 2000° C. and at a pressure of about 200 Kg/cm².

14. The method of claim 8, wherein said step of forming a plurality of surface portion sheets comprises preparing a matrix composition comprising a ceramic powder and applying said matrix composition to a cloth comprising fibers selected from the group consisting of SiC, Si-C-N, and combinations thereof.

* * * * *